March 3, 1970  P. K. BODGE  3,498,129
FLUID MASS FLOWMETER

Filed Oct. 3, 1967  3 Sheets-Sheet 1

INVENTOR.
PHILIP K. BODGE
BY
Robert J. Schiller
ATTORNEY

March 3, 1970  P. K. BODGE  3,498,129
FLUID MASS FLOWMETER
Filed Oct. 3, 1967  3 Sheets-Sheet 2
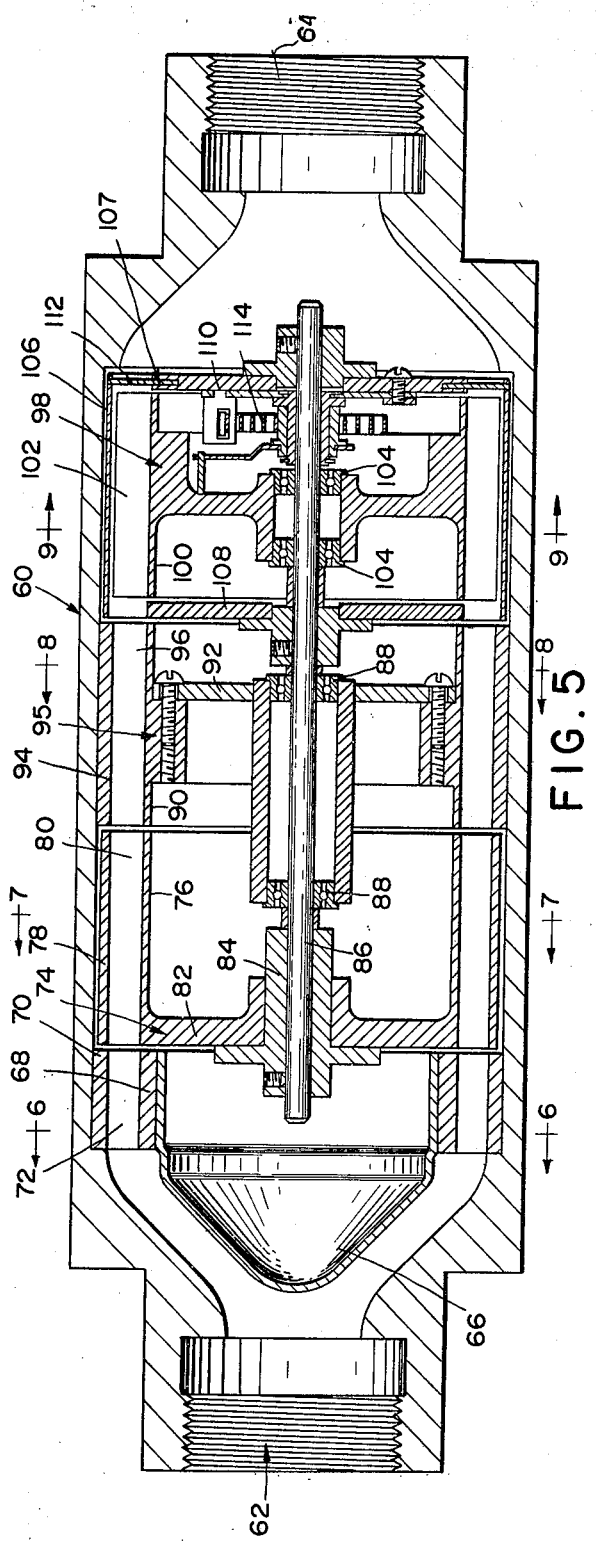
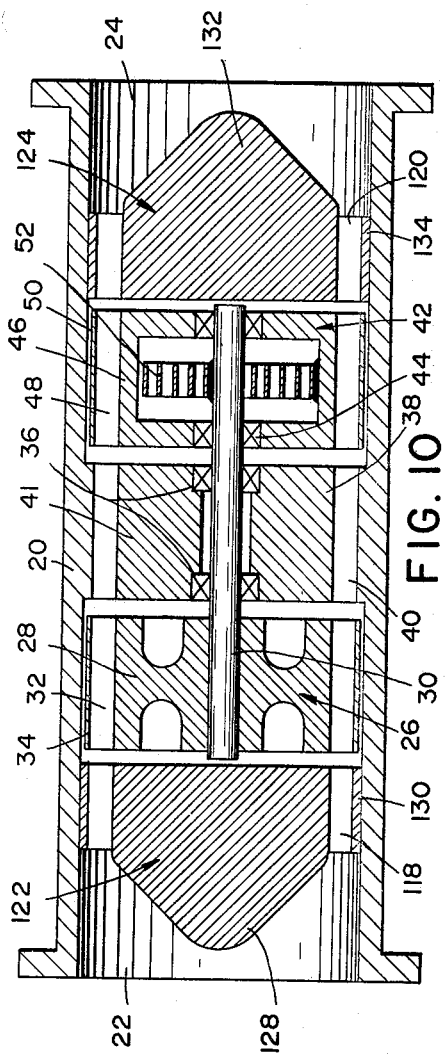
INVENTOR.
PHILIP K. BODGE
BY
Robert J. Schiller
ATTORNEY

INVENTOR.
PHILIP K. BODGE
BY
ATTORNEY

United States Patent Office 3,498,129
Patented Mar. 3, 1970

3,498,129
FLUID MASS FLOWMETER
Philip K. Bodge, 45 Abbot St.,
Andover, Mass. 01810
Filed Oct. 3, 1967, Ser. No. 672,514
Int. Cl. G01f 1/06
U.S. Cl. 73—231        5 Claims

ABSTRACT OF THE DISCLOSURE

A fluid mass flowmeter formed of a tubular casing enclosing a driving turbine and a metering turbine coaxially mounted, the former having skewed vanes so as to derive its rotation from a flow stream. The metering turbine is torque-responsively coupled to the driving turbine, and its turbine blades are axially directed. A flow director is positioned so that the fluid flow into the metering turbine is parallel to the blades of the latter.

This invention relates to flow measurement, and particularly to improved apparatus for measuring mass rate of fluid flow.

In many instances, the mass rate of fluid flow is more important or pertinent information than volumetric flow rate. This is particularly so, for example, in aircraft jet engine operation, where the rate at which fuel energy is supplied to the engine is much more accurately determined on the basis of fuel mass rather than volume. Typically, mass flowmeters are exemplified by the device described in U.S. Patent 3,144,769 issued Aug. 18, 1964 to E. E. Francisco, Jr.

In the latter device, in theory, the flowstream impinges upon a first or upstream turbine having a first free-running angular velocity for a given axial fluid flow velocity. A second or downstream turbine having a different free-running speed for the given axial fluid flow velocity, is torsionally coupled to the upstream turbine thereby constraining both turbines to rotate at the same angular velocity under steady state conditions. Each turbine, therefore, serves as a constraint for the other and any torque developed between them results in an angular displacement of one turbine with respect to the other. In the latter device the two compliantly coupled turbines are supported for rotation in "frictionless" bearings and therefore the fluid flowstream is the only cause creating a torsional reaction between them manifest as the angular displacement. Since the same flowstream must impinge upon both turbines it is clear that, under steady state conditions, the torque developed by one turbine is precisely equal and opposite to the torque developed by the other turbine. Therefore, the time rate of change of flowstream angular momentum caused by one turbine is precisely equal and opposite to the time rate of change of flowstream angular momentum caused by the other turbine. Thus, it is apparent that the net change in flowstream angular velocity due to the presence of the two torsionally coupled turbines is zero, i.e., the angular velocity of the output flowstream from the two turbines is the same as the angular velocity of the input flowstream to the two turbines. This will be recognized as simply a manifestation of Newton's Third Law for rotation. From the foregoing, it follows that the angular velocity of the two torsionally coupled turbines must be equal to the free-running velocity of the downstream turbine, and the torque developed between the two turbines must be proportional to the product of the mass flowrate and the difference between the free-running angular velocities of the two turbines. Also from the foregoing, it is evident that there are an infinite number of combinations of the two turbines' free-running speeds which will produce the same difference and therefore the same torque, while the angular velocity of the two turbines rotating together will be different for each particular combination producing this same torque. Likewise, there are an infinite number of combinations of the two turbines' free-running speeds which, by always keeping the downstream turbine's free-running speed unchanged, will produce different torques and yet the angular velocity of the two turbines rotating together will remain the same. Thus, it is seen that the change in flowstream angular velocity, $\omega_1$ which produces the torque—and therefore the angular displacement—between the two turbines, bears no functional relationship to the angular velocity, $\omega_2$, of the two turbines rotating together. This is an extremely important point and will be referred to later.

In symbolic form the following is the essence of the foregoing analysis where:

$dM/dt$=mass flowrate in pounds (of mass) per second.

$A$=cross sectional area of flow passage through the turbines in inches$^2$.

$P_m$=density of fluid flowstream in pounds (of mass) per inches$^3$.

$V$=axial velocity of fluid flow in inches per second.

$dH/dt$=time rate of change of flowstream angular momentum in inch-pounds (force), i.e., in.-lb.-sec./sec.

$T$=torque in inch-pounds (of force).

$r$=radius of gyration of flow passage through the turbines in inches.

$g$=gravitational constant equal to 386 inches per second$^2$.

$\theta$=angular displacement of one turbine with respect to the other in radians.

$\omega_1$=difference between the free-running speeds of the two turbines, and represents the change in flowstream angular velocity that produces the torque between the two turbines, in radians per second.

$\omega_2$=angular velocity of the two turbines, rotating together, in radians per second.

$k_1$=spring constant of the compliant coupling between the two turbines in inch-pounds (of core) per radian.

$k_2=r^2/g$ a lumped constant, comprising the square of the radius of gyration divided by the gravitational constant $g$, in inches-sec.$^2$.

$k_3=k_2/k_1$ in seconds$^2$=radians per pound (of force).

$t$=time in seconds.

Hence, (1) $$\frac{dM}{dt} = A^p m V$$

(2) $$\frac{dH}{dt} = T = k_1 \theta = \frac{r_2}{g} A^p m V \omega_1$$

(3) $$\theta = \omega_2 t$$

Now, substituting $\omega_2 t$ for $\theta$ and $dM/dt$ for $A^p m V$, Equation 2 becomes:

(4) $$k_1 \omega_2 t = k_2 \frac{dM}{dt} \omega_1$$

which reduces to:

(5) $$t = k_3 \frac{dM}{dt} \frac{\omega_1}{\omega_2}$$

Equation 5 shows that the time, $t$, required for the displacement angle, $\theta$, to rotate past a given reference point on the flowmeter is directly proportional to the mass rate of flow, $dM/dt$ provided that the quotient, $\omega_1/\omega_2$, always remains a constant.

To those skilled in the art, it will be immediately apparent that the angular velocity, $\omega_2$, will be significantly affected by the viscous frictional drag of the turbines rotating within a viscous flowstream. It is a well known fact that there are large variations in viscosity from one fluid to another and further, for any given fluid, the viscosity will vary widely and usually in a non-linear fashion with changes in temperature and shear rate. For example, petroleum derivatives are noted for their large viscosity changes with temperature, as are modern gelatinous aircraft fuels noted for their extreme range of viscosities with changes in shear rate. Therefore, it is evident that in order to preserve the integrity of Equation 5 for practical conditions of operation then $\omega_2$ must be modified in such a way as to show its decrease in angular velocity due to the viscous friction. It is clear that, for any particular given practical design, $\omega_2$ will be a complicated non-linear function involving at least four independent variables; $\mu$=absolute viscosity, $\tau$=temperature, $p$=density, and $V$=flow velocity. Expressed in symbolic form it is: $\omega_2 = f(\mu, \tau, p, V)$. Since it has already been shown that $\omega_1$ and $\omega_2$ bear no functional relationship to each other it is evident that the quotient, $$\frac{\omega_1}{f(\mu, \tau, p, V)}$$

cannot be a constant and therefore the time interval $t$, will not be accurately proportional to the mass flow rate $dM/dt$.

The present invention therefore has, as its principal object the provision of a flowmeter capable of measuring true mass flow of a fluid. Other objects of the present invention are to provide a mass flowmeter that is simple to manufacture and which will yield reliable results; to provide a mass flowmeter that is relatively insensitive to bearing friction; and to provide a mass flowmeter the accuracy of which will be unaffected by the viscous friction resulting from the viscosity of the fluid flowstream. Other objects of the invention will in part be obvious and will in part appear hereinafter. The invention accordingly comprises the apparatus possessing the construction, combination of elements, and arrangement of parts which are exemplified in the following detailed disclosure, and the scope of which will be indicated in the claims.

Generally, the present invention comprises a metering turbine mounted in a housing through which an axial flowstream can be directed. Means, preferably in the form of a second coaxial turbine, are provided for driving the metering turbine. The turbines are torque responsively coupled to one another so that one drives the other synchronously under steady state conditions. Means are included for insuring that the angular velocity of the two coupled turbines is identical to the change in flowstream angular velocity as it passes through the metering turbine. Thus, the rate at which the flowstream angular momentum is changed as it passes through the metering turbine, must be directly proportional to the angular velocity of the metering turbine, i.e., the angular velocity of the two synchronously coupled turbines.

For a fuller understanding of the nature and objects of the present invention, reference should be made to the following detailed description taken in connection with the accompanying drawings wherein:

FIG. 5 is a diagrammatic cross-section through a more detailed device embodying the principles of the present invention;

FIG. 10 is a diagrammatic cross-section through yet another device embodying the principles of the present invention.

Figure 1:
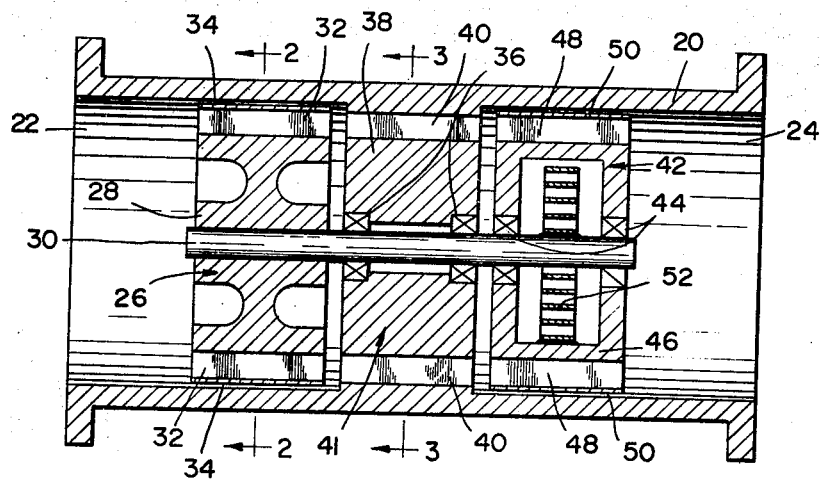
FIG. 1 is a diagrammatic cross-section through a simple device embodying the principles of the present invention.
Figures 2, 3:
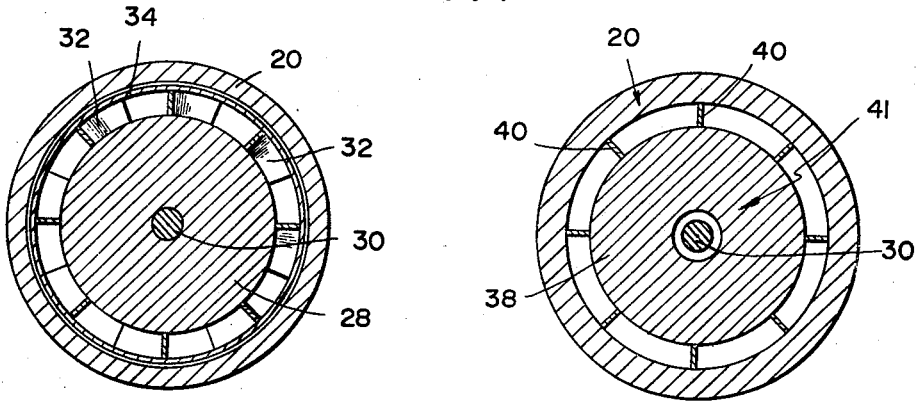
FIG. 2 is a cross-section taken along the line 2—2 through the embodiment of FIG. 1.
FIG. 3 is a cross-section taken along the line 3—3 through the embodiment of FIG. 1.

Referring now to FIG. 1 there will be seen an embodiment of the invention simplified for illustration of the principles involved, and including flowmeter housing 20, preferably in the form of a hollow, cylindrical duct having inlet and egress ports 22 and 24 at opposite ends. Housing or duct 20 thereby defines a passage along which axial fluid flow can occur. Disposed within the housing 20 for rotation about the longitudinal axis of the latter, is drive means such as first axial turbine 26. The latter typically comprises a central hub 28 fixedly mounted on an axially extending shaft 30. Radially extending from the circular periphery of the hub 28 are a plurality of vanes 32 preferably equiangularly spaced about hub 28. Each vane also extends approximately axially along the hub, actually skewed by a few degrees to a respective plane through the axis of shaft 30, particularly as shown in FIG. 2. Fixed to vanes 32 is also a ring or shroud 34, spaced from and held concentrically with shaft 30 and hub 28 by the vanes. Shroud 34 is dimensioned with an outside diameter small enough to permit close rotational clearance with respect to the inner periphery of duct 20 and extends axially along the duct at least the axial length of the vanes so as to form a cylinder. Thus, the shroud and hub form an annular passage in which the skewed vanes are radially distributed.

Shaft 30 is centrally located for rotation about its long axis in bearings 36. The latter in turn are supported within bearing sockets shown in second hub 38. The latter has a cross-sectional diameter preferably equal to hub 28. Mounted about the hub 38 are means, in the form of radial vanes 40, for constraining the fluid flow to a preferably axial path. Vanes 40, similar to vanes 32, are equiangularly spaced about hub 38 but extend preferably truly axially along the latter as shown particularly in FIG. 3.

Vanes 40 are fixed to the inner periphery of duct 20 and to hub 38 so that neither vanes 40 nor hub 38 can rotate. The upstream ends of vanes 40 are located preferably quite closely to the downstream ends of vanes 32. Thus, duct 20 and hub 38 define an annular passage which is almost a continuation of the annular passage formed by shroud 34 and hub 28, and hub 38 and vanes 40 form an axial flow-straightening member 41.

Mounted on shaft 30 is a metering or second axial turbine 42 adjacent the side of hub 38 opposite turbine 26. Metering turbine 42 is, however, rotatable independently of shaft 30 and to this end bearings 44 are provided on shaft 30 supporting turbine 42. Turbine 42 comprises a central or third hub 46 preferably hollowed and of the same diameter as hub 38. A plurality of radially extending vanes 48 are equiangularly disposed about hub 46 and joined to coaxial shroud ring 50 which fits closely for rotation within duct 20. Vanes 48 are preferably also axially disposed along duct 20 and should, like vanes 40, preferably have no skew angle. Metering turbine 42 is torque-responsively coupled to shaft 30 by spiral spring 52, preferably with linear spring characteristics, spring 52 being mounted within the hollow of hub 46 with opposite ends of the spring fixed respectively to hub 46 and shaft 30.

Figure 4:
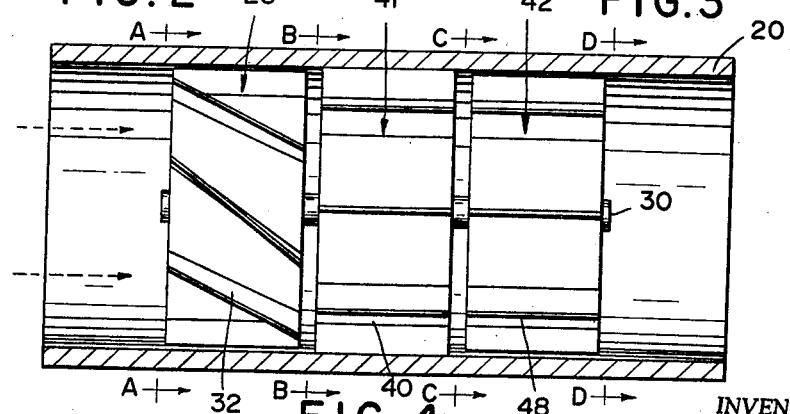
FIG. 4 is a schematic representation of selected elements of the embodiment of FIG. 1.

The operation of the device shown in FIG. 1 advantageously can be described in connection with schematic representation FIG. 4 wherein like numerals denote like parts. One can assume that a fluid flowstream, indicated by broken arrows, enters the device from the left.

In the following analysis, angular velocity $\Omega$, if of the flowstream, is identified as to its axial location by subscript letters keyed to the section lines shown in FIG. 4, and if of a flowmeter element is then identified by subscript numerals identical to those used hereinbefore to denote the element. All angular velocities are referenced with respect to the flowmeter casing 20 which is assumed to have zero angular velocity. Otherwise the symbols used will have the same meaning as when used hereinbefore in connection with Equations 1 to 5 inclusive.

By inspection it can be seen that (6) $\quad \Omega_{41} = \Omega_{CC} = \theta$ because the straight axial vanes 40 of the fixed flow straightener 41 serve to remove any net flowstream angular velocity about the principal axis as the flowstream traverses the member 41.

Also (7) $\quad \Omega_{42} = \Omega_{DD}$ for reasons similar to those in (6) above, i.e., the straight axial vanes 48 of metering turbine 42 serve to constrain the flowstream to rotate with an angular velocity equal to that of the constraining member 42 itself.

Driving turbine 26, because vanes 32 are skewed to the axial flow, will rotate at some angular velocity, and because of the torsional coupling due to spring 52, metering turbine 42 will ultimately rotate, under steady state conditions, at the same velocity.

Hence, at steady state, (8) $\quad \Omega_{26} = \Omega_{42}$ and by combining Equations 7 and 8, (9) $\quad \Omega_{26} = \Omega_{42} = \Omega_{DD}$ Mass flowrate $dM/dt$ through the flow passages of the flowmeter in units of "pounds per second," for example, is equal to the fluid density $p_m$ in pounds (of mass) per cubic inch times the square inch cross sectional area, A, of the flow passage times the axial velocity of fluid flow in inches per second. In symbolic form this is

(10) $\quad dM/dt = p_m A V$

Now the flowstream, as it traverses the metering turbine 42, has its angular velocity accelerated from $\Omega_{CC}$ to $\Omega_{DD}$ with a resulting time rate of change in angular momentum $dH/dt$ which is equal to the torque T, applied to the torsional coupling spring 52. The torque causes an angular displacement, $\theta$, to exist between the metering turbine 42 and the driving turbine 26. In symbolic form this is:

(11) $\quad \dfrac{dH}{dt} = T = k_1\theta = \dfrac{r^2}{g} p_m A V (\Omega_{DD} - \Omega_{CC})$ Into the familiar relationship wherein, "rate times time equals distance," the applicable rate and distance can be substituted to produce

(12) $\quad \Omega_{42} t = \theta$ where $t$ is the time required for the angular distance of the displacement angle $\theta$ to pass a given longitudinal reference point such as a fiducial mark on the flowmeter housing when rotating at an angular velocity equal to that of the rotating turbines as given by (8).

Selection of certain equalities from (11) gives

(13) $\quad k_1 \theta = \dfrac{r^2}{g} p_m A V (\Omega_{DD} - \Omega_{CC})$ which by substitution is

(14) $\quad k_1 \Omega_{42} t = k_2 \dfrac{dM}{dt} \Omega_{DD}$ where $$k_2 = \dfrac{r_2}{g}$$

which rearranges to

(15) $\quad t = k_3 \dfrac{dM}{dt} \dfrac{\Omega_{DD}}{\Omega_{42}}$

From (7) it is known that $\Omega_{42} = \Omega_{DD}$, and therefore the quotient $\Omega_{DD}/\Omega_{42} = 1$.

Thus Equation 15 shows that the time $t$ is directly proportional to the mass rate of flow $dM/dt$ regardless of the angular velocity of the rotating turbines.

It will be apparent that the above results arise because the angular velocity of the rotating member has been constrained to be identical to the change in flowstream angular velocity which traverses the metering turbine and produces the time rate of change in flowstream angular momentum.

A number of techniques are available to present the output time signal $t$ in terms of mass flowrate. For example, each turbine can be provided with a small permanent magnetic element, disposed at the turbine periphery, the two magnets being axially aligned when the turbines are at rest. Magnetic pick-up coils are then provided outside the flowmeter casing. As the turbines rotate, the angular aperture or displacement angle $\theta$ between them will be apparent in the form of a time difference between the signals induced by the magnets at the respective pick-up coils. This time difference is the particular function represented by Equation 15. Thus, the induced signal at one coil is used to start a clock having an output pulse train of known repetition rate. The induced signal, when it occurs at the other pick-up, stops the clock. The number of pulses occurring during the running of the clock is then directly proportional to the mass flow rate $dm/dt$. It is evident that the pulse repetition rate of the clock may be selected to present a readout in terms of any convenient unit of mass flowrate such as pounds per second, kilograms per hour, etc.

The accuracy of the flowmeter exemplified in FIG. 1 is clearly unaffected by extraneous torques as may be applied to the driving turbine such as frictional drag due to old and worn main bearings 36, or viscous frictional drag generated between shroud ring 34 and flowmeter casing 20. However, reference to FIG. 5 will show a more detailed alternative embodiment of the invention having all of the advantages of the earlier embodiment, but with somewhat different construction, which enables it to be essentially free of measuring error due to the viscous drag upon the metering turbine itself.

Figure 6:
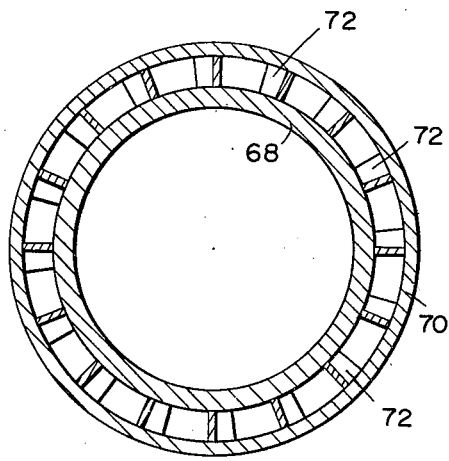
FIG. 6 is a cross-section taken along line 6—6 through the device of FIG. 5.

Referring now to FIG. 5, there will be seen a sectional view of a flowmeter comprising a housing 60, preferably in the form of a hollow cylindrical duct having inlet and egress ports 62 and 64 at opposite ends, duct 60 thereby defining a passage along which axial fluid flow can occur. Means are provided for limiting the fluid flow to an annular path and to this end a cone or faired hub 66 coaxially fixed within cylindrical ring 68 shaped and dimensioned to divert fluid flow from inlet port 62 into an annular channel around ring 68. Concentric with ring 68 is a second cylindrical ring 70 dimensioned to fit tightly within housing 60 and held separated from ring 68 by a plurality of guide vanes 72. As shown in FIG. 6, vanes 72 are substantially equiangularly spaced about ring 68 and extend radially therefrom. Each of vanes 72 is skewed or canted at some angle, generally at some angle considerably less than 90° to the axis of housing 60, so that fluid in passing through the annular interspace between rings 68 and 70, will have a tangential component of angular velocity imparted thereto.

Figure 7:
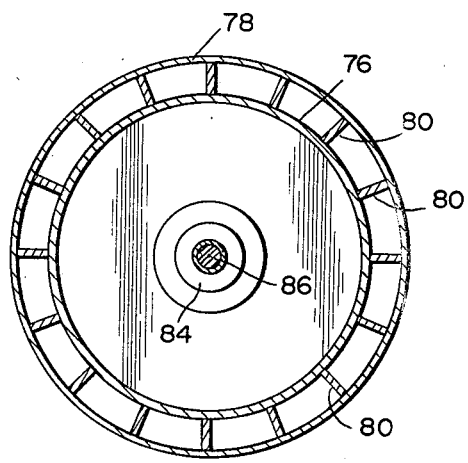
FIG. 7 is a cross-section taken along line 7—7 through the device of FIG. 5.

Disposed closely adjacent the downstream edge of guide vanes 72 is a first, or prime mover turbine 74 formed of an inner cylindrical ring 76 having the same diameter as ring 68 and an outer or shroud ring 78 having an outside diameter small enough to provide rotational clearance from the inner diameter of housing 60. Rings 76 and 78 are fixed for rotation with one another, being joined by a plurality of radial vanes 80, preferably having flat surfaces axially disposed as shown in FIG. 7. A central plate 82 is fixed across ring 76 and connected to an apertured hub 84. The latter is mounted adjacent one end of elongated shaft 86 to which it is fixed, as by set screw, splines or the like.

Figure 8:
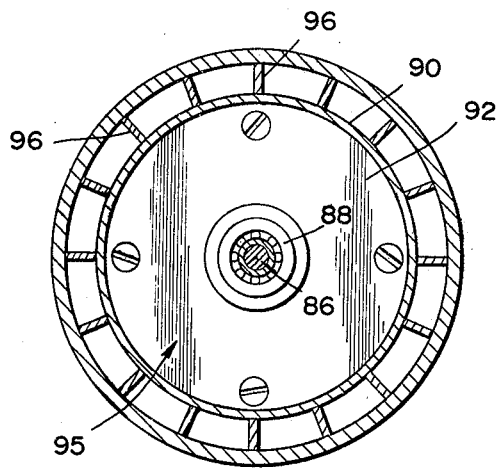
FIG. 8 is a cross-section taken along line 8—8 through the device of FIG. 5.

As shown in FIGS. 5 and 8, shaft 86 is rotationally supported by main bearings 88. The latter in turn are supported concentrically within cylindrical ring 90 by disc-and-hub assembly 92. Ring 90, also of substantially the same diameter as rings 68 and 76, is fixed to and spaced from concentric cylindrical ring 94 by a plurality of fixed radial vanes 96 having their flat surfaces axially disposed. Ring 94 is dimensioned to fit tightly within housing 60 and both rings 90 and 94 are disposed to be closely adjacent the downstream edges of rings defining prime mover turbine 74. Vanes 96 are so constructed that any net angular velocity about the principal axis that may be present in the flowstream on the upstream edge of vanes 96 is removed by the latter. Thus, vanes 96 and rings 90 and 94 constitute axial flow straightener 95.

Figure 9:
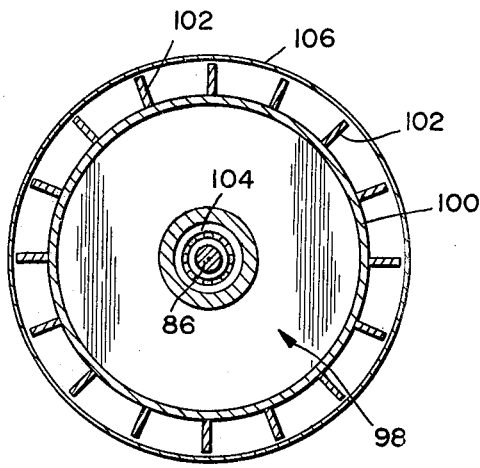
FIG. 9 is a partial cross-section taken along line 9—9 through the device of FIG. 5.

As shown in FIGS. 5 and 9, metering or second turbine 98 preferably comprises an inner cylindrical ring 100 of substantially the same diameter as ring 68, having a plurality of equiangularly spaced radial vanes 102 extending outwardly therefrom and having their flat surfaces axially disposed. Turbine 98 is concentrically mounted on bearings 104 which ride on shaft 86 so that the turbine is rotatable with respect to the shaft. A cylindrical outer or shroud ring 106 is provided concentric with ring 100 but rotatable with shaft 86, and is fixedly connected to the latter by circular disc 110 and a plurality of equiangularly spaced radial spokes 112. Also a thin circular disc 108 is rigidly attached to shaft 86 and is located between and adjacent the respective inner rings 90 and 100 of the flow straightener and then metering turbine. Thus, the three cooperating members, shroud ring 106, support disc 110, and decoupling disc 108 serve to form a viscosity shield 107 surrounding the metering turbine 98 while allowing the flow stream to pass through the annular passage between rings 100 and 106. Metering turbine 98 is so dimensioned to provide close rotational clearance within the confines of the surrounding viscosity shield 107.

The torsionally compliant coupling spring 114, preferably a spiral spring with linear characteristics, is mounted with one end fixed to disc 110 and the other end fixed to turbine 98. Thus, spring 114 constitutes means for torque-responsively coupling the metering turbine 98 to the shaft 86.

The structure of FIG. 5 should be dimensioned such that substantially the entire flowstream from ingress to exit traverses the annular flow passages between the respective pairs of inner and outer rings. The flow passages, provided between the inner and outer rings of the flow straightener 95, and the inner ring 100 of the metering turbine and the outer shroud ring 106 of viscosity shield 107, are sufficiently long, narrow and shallow so that the net angular velocity of the flowstream as it exits from each of these members is substantially identical to that of the member.

The operation of the device of FIG. 5 is similar to that of FIG. 1 though differing in a number of significant aspects. It will be appreciated that prime move turbine 74 receives its rotational impulse by an exchange of angular momentum between it and the flowstream which has had angular momentum imparted to it in passing through a static set of skewed vanes 72. This is simply another means for driving the metering turbine and does not alter the operation of the device, though in some instances this configuration may result in a flowmeter that is easier to manufacture and assemble. It should be noted that the analysis of the device of FIG. 1 is also valid for that of FIG. 5.

Of importance is the addition of the viscosity shield 107 that surrounds metering turbine 98 and is fixedly connected to prime mover turbine 74. It has already been indicated that the accuracy of the flow measurement is not affected by extraneous torques applied to the prime mover turbine and it can be seen that the viscosity shield serves to transmit the viscous drag torques, formerly resulting from the metering element rotating in close proximity to stationary members immersed in a viscous medium, directly to the prime mover without having to be transmitted to the prime mover by way of torque-responsive spring coupling 114. Under steady state conditions the metering turbine and the viscosity shield have identical angular velocities and, since there is no relative motion between these two members, no viscous drag torques can be developed between them. The torque then applied to the spring coupling is simply that which is developed by the metering turbine during its process of accelerating the flowstream angular velocity from an angular velocity equal to the flow straightener discharge angular velocity to an angular velocity identical to the angular velocity of the metering turbine itself.

Certain devices of the invention may be unidirectional while others may be bidirectional, i.e., capable of measuring mass flowrates in either direction. For example, as shown in FIG. 10 wherein like numerals denote like parts, invention is essentially identical to that of FIG. 1 except for the addition of flow guiding member 122 at the left hand port and a flow straightener 124 at the right hand port. Guide member 122 comprises a faired inner hub 128 connected to an outer ring 130 by a plurality of equiangularly spaced radial vanes 118 which are preferably axially directed with no skew angle. The only function of member 122 for either direction of flow is to provide a smooth transition of flow into the annular flow passage between inner hub 128 and outer ring 130. Guide member 122 is dimensioned to fit tightly within the inside of casing 20 and is located with a running clearance but closely adjacent the left hand face of the skewed vaned prime mover turbine 26.

Guide member 124 is similar to member 122 and compirses a faired inner hub 132 connected to outer ring 134 by radial vanes 120 which are preferably axially directed and have no skew angle. Guide member 124 fits tightly within housing 20 and is located with a running clearance but closely adjacent the right hand edge of the metering turbine 42. When the flowstream traverses the flowmeter from left to right this guide member has no critical purpose other than to assist in a smooth flow transition from the annular flow passage to the exit port 24. However, when the flowstream is from right to left then member 124 serves as an axial flow straightener in the same way as did the flow straightener 41 of FIG. 1 when the flow was in the opposite direction. Thus, it may be seen that the same analysis as applied to FIG. 1 is equally valid here for either direction of flow. It should be noted here that the simplified structure of metering turbine 42 may be replaced by the combination metering turbine and viscosity shroud structure of FIG. 5 without affecting the validity of the aforementioned analysis.

Numerous modifications can be made to the invention without departing from the basic principles involved. For example, as in FIG. 5 the set of static skewed vanes 72 could be pivotally mounted and spring responsive to the axial flow velocity so as to have increased skew angle at low flowrates and decreased skew angle at high flowrates. Likewise, skewed-vaned prime mover turbine 26 of FIG. 1 can be replaced by a variable pitch propeller type prime mover having either a linear or non-linear inverse relationship between skew angle and axial flow velocity. A hysteresis clutch could also be used to couple prime mover turbine 26 of FIG. 1 to the shaft 30. The foregoing variations can be made to improve the resolution of the devices at low flowrates; however, the basic accuracy of the flow measurement would remain unchanged.

Also, by logical extension of the teachings herein, the same principles apply as well to concentric configurations having radial flow paths rather than the axial types of the foregoing. By further extension of the earlier analysis it can be seen that it is desirable, though not essential, that the skew angle of the flow straightener and of the metering turbine be zero. The criterion is simply that the skew angle of these two members, whether zero or some other angle, must be the same.

Since certain changes may be made in the above apparatus without departing from the scope of the invention herein involved it is intended that all matter contained in the above description or shown in the accompanying drawings shall be interpreted in an illustrative and not in a limiting sense.

What is claimed is:

1. A fluid mass flowmeter comprising, in combination, means defining a channel for providing a path for fluid flow therethrough;
  a first rotatable device disposed in said path for fluid flow therethrough;
  drive means comprising a second rotatable device disposed in said path so as to derive driving energy from said fluid flow, said second rotatable device comprising a turbine having a plurality of radially extending blades, said blades being mounted so as to have surfaces skewed with respect to the axis of rotation of said turbine;
  means connecting said first rotatable device to be driven by said drive means at an angular velocity so as to impart a net change in angular momentum to said flow stream and produce a net torque between said drive means and said first device;
  means for insuring that the angular velocity of said first rotatable device is the same as the change in angular velocity of said flow streams as the latter traverses said first device; and
  means responsive to said torque for providing an angular displacement between said drive means and said first device proportional to said torque;
  whereby said displacement is proportional to the product of said velocity times the mass rate of flow of said fluid, and therefore the time required for said displacement to rotate with respect to a reference point is proportional to said mass rate of flow.

2. A fluid mass flowmeter comprising, in combination, means defining a channel for providing a path for fluid flow therethrough;
  a first rotatable device disposed in said path for fluid flow therethrough;
  drive means comprising a second rotatable device disposed in said path so as to derive driving energy from said fluid flow, and a plurality of fixed skewed vanes positioned adjacent said second device, said second device comprising a turbine having a plurality of radially extending blades mounted with flat surfaces thereof extending substantially parallel to the axis of rotation of said second device;
  means connecting said first rotatable device to be driven by said drive means at an angular velocity so as to impart a net change in angular momentum to said flow stream and produce a net torque between said drive means and said first device;
  means for insuring that the angular velocity of said first rotatable device is the same as the change in angular velocity of said flow stream as the latter traverses said first device; and
  means responsive to said torque for providing an angular displacement between said drive means and said first device proportional to said torque;
  whereby said displacement is proportional to the product of said velocity times the mass rate of flow of said fluid, and therefore the time required for said displacement to rotate with respect to a reference point is proportional to said mass rate of flow.

3. A fluid mass flowmeter comprising in combination, means defining a channel for providing a path for fluid flow therethrough;
  drive means comprising a second rotatable device disposed in said path so as to derive driving energy from said fluid flow, said rotatable devices comprising coaxially mounted, bladed turbines, the blades of said first device comprising substantially flat blades mounted radially about the axis of rotation of said first device and having flat surfaces thereof extending substantially parallel to said axis;
  means connecting said first rotatable device to be driven by said drive means at an angular velocity so as to impart a net change in angular momentum to said flow stream and produce a net torque between said drive means and said first device;
  means for insuring that the angular velocity of said first rotatable device is the same as the change in angular velocity of said flow stream as the latter traverses said first device, said means for insuring comprising means for diverting the flow stream so that the latter is substantially parallel to the axial direction of the blades of said first rotatable device; and
  means responsive to said torque for providing an angular displacement between said drive means and said first device proportional to said torque;
  whereby said displacement is proportional to the product of said velocity times the mass rate of flow of said fluid, and therefore the time required for said displacement to rotate with respect to a reference point is proportional to said mass rate of flow.

4. A flowmeter as defined in claim 3 wherein said means for diverting said flow comprises a plurality of substantially flat vanes radially mounted with respect to the axis of rotation of said first device and fixed with respect to said means defining a channel, with the flat surfaces of said vanes extending substantially parallel to said axis and positioned adjacent said first device.

5. A fluid mass flowmeter comprising, in combination, means defining a channel for providing a path for fluid flow therethrough;
  a first bladed turbine device rotatable about an axis and disposed in said path for fluid flow therethrough;
  drive means comprising a second bladed turbine device rotatable about said axis in axially-spaced relation to said first device and disposed in said path so as to derive driving energy from said fluid flow;
  compliant means connecting said first turbine device to be driven by said drive means at an angular velocity so as to impart a net change in angular momentum to said flow stream and produce a net torque between said drive means and said first turbine device;
  means for insuring that the angular velocity of said first turbine device is the same as the change in angular velocity of said flow stream as the latter traverses said first turbine device, said means for insuring comprising stationary bladed means disposed in said path between said first and second turbine devices; and means responsive to said torque for providing an angular displacement between said drive means and said first turbine device proportional to said torque;

whereby said displacement is proportional to the product of said velocity times the mass rate of flow of said fluid, and therefore the time required for said displacement to rotate with respect to a reference point is proportional to said mass rate of flow.

References Cited

UNITED STATES PATENTS

| | | |
|---|---|---|
| 3,044,294 | 7/1962 | Wilhelm. |
| 3,144,769 | 8/1964 | Francisco. |
| 3,276,258 | 10/1966 | Rowley. |
| 3,344,666 | 10/1967 | Rilett. |

FOREIGN PATENTS

| | | |
|---|---|---|
| 740,037 | 11/1955 | Great Britain. |

RICHARD C. QUEISSER, Primary Examiner

JOHN K. LUNSFORD, Assistant Examiner